United States Patent [19]

Richardson

[11] 4,156,021

[45] May 22, 1979

[54] OLEAGINOUS FIBROUS SIMULATED FOOD PRODUCT

[75] Inventor: Terence W. Richardson, Oakland, Calif.

[73] Assignee: Maxfibe, Inc., Palm Desert, Calif.

[21] Appl. No.: 775,902

[22] Filed: Mar. 9, 1977

Related U.S. Application Data

[63] Continuation-in-part of Ser. No. 715,909, Aug. 19, 1976, abandoned, which is a continuation-in-part of Ser. No. 663,498, Mar. 3, 1976, abandoned.

[51] Int. Cl.$^2$ .......................... A23D 5/00; A23L 1/04
[52] U.S. Cl. .................................. 426/104; 426/250; 426/330.6; 426/573; 426/574; 426/575; 426/577; 426/604; 426/613; 426/658; 426/804; 426/802
[58] Field of Search ............... 426/104, 601, 532, 604, 426/613, 656, 658, 573, 575, 250, 804, 330.6, 574, 577, 802

[56] References Cited

U.S. PATENT DOCUMENTS

| | | | |
|---|---|---|---|
| 2,714,083 | 7/1955 | Ferguson | 424/180 |
| 3,023,104 | 2/1962 | Battista | 426/804 |
| 3,067,037 | 12/1962 | Herald et al. | 426/568 X |
| 3,360,374 | 12/1967 | Barr et al. | 426/615 |
| 3,574,634 | 4/1971 | Singer | 426/804 X |
| 3,623,885 | 11/1971 | Hamdy | 426/104 X |
| 3,630,757 | 12/1971 | Meld | 426/15 |
| 3,676,150 | 7/1972 | Glicksman et al. | 426/804 X |
| 3,867,560 | 2/1975 | Menzi et al. | 426/804 X |
| 3,881,024 | 4/1975 | Pahonndis et al. | 426/578 |
| 3,911,159 | 10/1975 | Heusden | 426/656 |
| 3,998,976 | 12/1976 | Pernod et al. | 426/804 X |

OTHER PUBLICATIONS

Glicksman, "Hydrocolloid Utilization in Fabricated Foods", *Cereal Foods World,* vol. 21, No. 1 (1976), pp. 17-20, 22, 23 and 26.

Scala, "Fiber, The Forgotten Nutrient", *Food Technology,* Jan. 1974, pp. 34-36.

*Primary Examiner*—Robert A. Yoncoskie
*Attorney, Agent, or Firm*—Theodore J. Long; Harry C. Engstrom; Nicholas J. Seay

[57] ABSTRACT

Simulated food products are provided by incorporating flavoring, coloring, and texturizing agents with a low calorie oleaginous fibrous food base composition. The base composition comprises a mixture of edible gum, edible oil, water and particulate fibrous cellulose. The base composition may be produced by mixing an edible gum with water, mixing an oil and emulsifier therewith to form a binding mixture, and uniformly mixing particulate fibrous cellulose throughout the mass of the binding mixture, with flavoring, coloring, and texturizing agents being added as appropriate to form a desired simulated food product.

29 Claims, No Drawings

OLEAGINOUS FIBROUS SIMULATED FOOD PRODUCT

This application is a continuation-in-part of U.S. application Ser. No. 715,909, filed Aug. 19, 1976 now abandoned, which in turn is a continuation-in-part of U.S. application Ser. No. 663,498, filed Mar. 3, 1976 now abandoned.

BACKGROUND OF THE INVENTION

1. Field of the Invention

This invention pertains generally to simulated foods and to methods of making such foods; and more particularly to an oleaginous fibrous simulated food product and method.

2. Description of the Prior Art

There is an obvious and long-felt need in the United States and other developed nations of the world for foods which will satisfy a consumer's hunger but which have highly reduced caloric content and which have very low or no saturated fat and cholesterol. The high incidence of overweight among the populations of western countries is indicative of the overuse of high caloric content foods in these countries. Moreover, many of the ailments which afflict people living in the more advanced countries have been related by researchers to the "modern" diets consumed by the people in these countries. One well known example of a disease which has been related to diet is coronary arteriosclerosis, commonly considered to be partially due to the intake of excessive cholesterol and saturated fat. However, there has been growing evidence that modern diets which contain little or no dietary fiber may contribute to a variety of major and minor ailments, including constipation and colon cancer, and also possibly to a lesser extent, obesity, varicose veins, diverticulosis, and heart disease. David Ruben, M.D., *The Save-Your-Life Diet*, Random House, New York, 1975. The natural undigestible fiber or roughage contained in natural foods consists primarily of cellulose, hemicellulose, lignins, pectins, and small traces of other substances, with cellulose being the major constituent. These natural fibers are virtually undigestible but are becoming generally recognized as an essential component of proper nutrition, with suggested daily dietary fiber requirements being in the range of 20–40 gms. or more.

Because of the great desirability of increasing the fiber content of foodstuffs, both to decrease caloric content and to obtain the beneficial properties of fiber, attempts have been made to add refined fibrous cellulose to food compositions. Since refined fibrous cellulose is similar in feel and appearance to flour, this type of cellulose has been used as a bulking agent in farinaceous foods such as breads, pastas and other flour based products. The percentage of the fibrous cellulose versus other food components which can be used in such farinaceous foods has been limited if a product having a desirable texture and body is to be obtained. Moreover, previous food products containing fibrous cellulose have been found somewhat objectionable because of the mouth feel of the cellulose particles.

Soluble cellulose derivatives such as cellulose ether and gums and cellulose crystallite aggregates have been added to food products and are widely used as stabilizers and texture enhancers for natural food materials. However, the use of these cellulose derivatives has been limited to only very small percentages in relation to the weight of the overall food product, in the range of 1–2% or less, and attempts to use such cellulose derivatives as bulking agents in substantial quantities have been generally unsuccessful because of the unpalatability of the resulting product.

It is apparent that the primary requisite of a fiber enhanced natural or simulated food is palatability to the consumer, with the simulated food preferably being as close as possible in taste and texture to a common natural food.

SUMMARY OF THE INVENTION

The simulated or synthetic food products of my invention contain large amounts of cellulosic fibers, but are nonethless palatable to the consumer. The high concentration of fibrous cellulose in the simulated food products of my invention allows such products to supplement the necessary ration of such fibers in a well balanced diet, and it is provided in a form which can simulate natural food products and thus be readily acceptable to the consumer. Such products are low in calories because of the high proportion of cellulose fibers in relation to digestible food material, and because of the substantial water absorption capabilities of cellulose fiber, thus allowing substantial satiation of appetite without the intake of excess and unneeded calories.

A base food product in accordance with my invention comprises separated fibrous cellulose particles uniformly intermixed within a binding mixture. The binding mixture is formed as a mixture of a colloidal suspension of a natural edible oil and a natural gum or hydrocolloid in water. The binding mixture provides a viscous matrix in which the cellulose particles are dispersed and supported. This oleaginous base may be varied such that the product is in the form of a heavy liquid, a spreadable solid, a semi-solid or a foamed product in which gases are introduced into the product. This base material is a smooth textured and bland flavored base, with the flavor and texture of the final product being primarily determined by flavor additives and texturizers that are added to the base material. For example, the base product may have flavoring, coloring and texturizing ingredients added thereto to simulate margarine, cheese spreads, peanut butter, meat, fish and poultry spreads. Other products which can be simulated with the incorporation of flavor and texturizers with the base product include coffee creamers, ice cream, candies, whipped creams, pastry frostings, cream soups, mayonnaise, salad dressings, puddings, soups, simulated meat products, fruit sauces and dips.

Although it is desirable to eliminate or minimize the saturated fat and cholesterol in the food products of my invention, it is possible to utilize animal fats such as butter fats in liquified form as the oil in the base product of my invention, with the resulting product closely simulating natural milk derived products, but because of the bulk of the cellulose fiber, having fewer calories per gram and obtaining the benefits of cellulose fiber in nutrition.

Further objects, features, and advantages of my invention will be apparent from the following detailed description illustrating preferred embodiments of a low calorie food base composition and simulated food products produced therefrom exemplifying the principles of my invention.

DESCRIPTION OF THE PREFERRED EMBODIMENTS

As indicated above, it is desirable to provide a cellulose fiber fortified simulated food composition which has many of the attributes of natural foods in order to be attractive to the consumer, and which in its base form does not contribute substantially to the usable caloric intake. Such simulated food compositions must not only be palatable to persons who will consume them, but also must be physiologically compatible with the human digestive system.

It has been determined that the cellulosic fibers contained in natural foods contribute very little, if any available caloric value to humans, and it is generally assumed that humans are not capable of providing the enzymes and other digestive juices required to digest cellulose. However, since virtually all plant matter consumed by humans contains some cellulose, it is apparent that most naturally occurring cellulosic materials are not harmful to the human digestive tract. In fact, the "roughage" or bulk provided by the cellulosic materials and other indigestible materials is often necessary for proper human digestion. As discussed above, there is substantial evidence to suggest that non-nutritive fiber material is valuable in the human digestive process in minimizing the impact of various functional diseases such as cancer, heart disease, varicose veins, and diabetes.

I have determined that fibrous cellulose obtained from such natural materials as wood, cotton, grains, vegetable material and so forth may, under proper conditions and with proper treatment, be utilized as a major non-nutritive component of food substitutes and as a hygienic dietary additive to standard food products. This cellulose should preferably be in the form of separated cellulosic fibers, with substantially all of the binding material between the fibers, such as lignin and pectin, removed in order to provide a bland material which will not contribute substantially to the flavor of the final product. An example of a satisfactory cellulose fiber is wood pulp which has been digested by either the well-known sulphate or sulphite process to remove the binders, although similar fiber obtained by other processes is also satisfactory. The resulting cellulose fiber may be washed and cleansed to remove any traces of extraneous chemicals, and then mechanically ground to reduce the fibers down to sufficiently small size to provide adequate palatability. I have found that a cellulose particle size which averages 20 to 40 microns or less in length provides satisfactory palatability and mouth feel to a majority of human subjects. Average particle sizes greater than about 40 microns in length results in a product having a "gritty" mouth feel, which is unacceptable to most consumers.

One type of particulate fibrous cellulose satisfactory for use in my food product is obtained from the Brown Company of Berlin, New Hampshire, under the trade name Solka-Floc BW-300. Such particulate fibrous cellulose, also known as powdered cellulose, is a mechanically disintegrated and purified cellulose generally obtained from primarily alpha cellulose derived from wood pulp. 99.5% of this material will pass through a 33 micron screen and 99.0% will pass through a 23 micron screen. The average fiber length is 21 microns and the average fiber width is 17 microns. The most satisfactory palatability of my food product is obtained with relatively fine powdered cellulose such as Solka-Floc BW-300, or any equivalent powdered cellulose, because the relatively small particle size of the cellulose fibers minimizes the gritty mouth feel of the insoluble cellulose, and also allows the cellulose fibers to be easily distributed within a water-gum-oil suspension matrix.

The base product of my invention consists essentially of a major portion of separated fibrous cellulose particles, a natural edible oil such as vegetable oil, and a hydrocolloid (gum) binder or mucilage, with the gum and oil both being placed in colloidal suspension in water to form a binding mixture which, upon addition and thorough dispersion of particulate fibrous cellulose, will hold the cellulose fibers in suspension. Various flavorings, colorings and other additives may be added in order to obtain a food substitute product which simulates a natural food. The end product may be in the form of a liquid, a spreadable solid, a semi-solid or a foamed product in which air or other gases are introduced into the product to cause it to froth.

It may be noted that the caloric content of the overall resulting food substitute product is contributed almost entirely by the organic substances other than the cellulose fiber particles, and the nature of this caloric content can be controlled, for example, to exclude substantially all saturated fat and cholesterol.

It is desired that the overall cellulose fiber content of the final product on a "dry weight basis" (meaning as a percentage of all ingredients other than water) should be at least 10% to assure sufficient fiber content to provide the benefits of my invention, and not more than about 85% to allow for sufficient binding mixture and flavor, color, texture and other additives to permit simulation of natural foods. The edible oil content on a dry basis should be at least 8% to provide a significant oleaginous character to the composition, (see Example II), and may be as great as 60% where it is desired to simulate certain high fat natural foods such as cheese or sausage. Of course, where it is desired to have a simulated food of very low caloric content, the oil content will normally be less than about 30%. The gum content is normally provided by a combination of gums selected for their specific known properties, in total amounts of from about 0.1% to 5% to provide the desired viscosity within the binding mixture as well as palatability. The water component of the composition will normally be sufficient to provide at least 40% water in the final simulated food product, and may be much greater as in simulated soups and milk products.

The following examples are provided as illustrative of the product and process of my invention, but it is understood that my invention is not limited to the specific details thereof.

EXAMPLE I

One kilogram of a low calorie oleaginous fibrous food base composition was prepared having the ingredients listed below.

| Ingredient | Amount |
|---|---|
| Water | 626 gm. |
| Locust Bean Gum | 5.1 gm. |
| Guar Gum | 5.1 gm. |
| Carrageenan | 1.62 gm. |
| Corn Oil | 79.3 gm. |
| Polyoxyethylene (20) Sorbitan Monostearate (Polysorbate 60) | 0.4 gm. |
| Separated and Purified Cellulose Fibers (Brown | |

| Ingredient | Amount |
| --- | --- |
| Company Solka-Floc BW-300) | 282.48 gm. |

A first hydrocolloid or gum mucilage mixture was prepared by adding the 5.1 gm. of locust bean gum in-stream fashion to 192.4 gm. of water at 175° F. in a Waring high shear type blendor and mixed for a period of three minutes. The resulting mucilage mixture was slowly stirred at a temperature of 175° F. for 10 minutes.

The 5.1 gm. of guar gum was added in-stream fashion to 259.26 gm. of water at 100° F. in a Waring blendor set at first speed to create a vortex and mixed for a period of three minutes. This gum mucilage mixture was held at 100° F. while awaiting further processing.

The 1.62 gm. of carrageenan was added in-stream fashion to 173.93 gm. of water at 70° F. in a Waring blendor, and mixed for a period of three minutes. The other gum mixtures listed above were then added to the carrageenan mixture, and the total was mixed together at high speed for two minutes. As in all examples herein, the gum mixtures were mixed at sufficient speed and temperature to prevent lumping of the gums within the mixture.

The corn oil was heated to 130° F. and mixed with the polysorbate 60 and was then added in and thoroughly mixed together with the gum mixture. The finely divided purified cellulose fibers were then placed in the bowl of a Hobart mixer, and the other materials listed above were added and mixed in with the cellulose fibers with the mixer set at top speed for approximately five minutes. Use of polysorbate 60 or other emulsifier is preferred in order to obtain a stable oil in water emulsion.

The resulting product was substantially odorless, had a grayish-white color, and a bland taste. The texture of this food base composition was smooth and easily masticated. The product had a slippery mouth feel characteristic of other oleaginous products such as margarine, but did not leave the feeling of residual "grease" or oil in the mouth after the product was swallowed. The cellulose fiber comprised 75.7% of the non-water components of the base composition, and the hydrocolloids and the oil comprised 3.15% and 21.15%, respectively, of the non-water base components.

Liquid flavorings and colorings were easily added and intermixed with the oleaginous fibrous food base composition to provide a product that simulated the flavor and color of margarine, cheese spread, and other smooth textured oleaginous materials such as cheese dip and salad dressing.

EXAMPLE II

A low caloric content oleaginous fibrous imitation cheese spread was prepared having the following components stated in grams per kilogram.

| Ingredient | Amount |
| --- | --- |
| Water | 560.7 gm. |
| Locust Bean Gum | 4.8 gm. |
| Guar Gum (Cesalpinia) | 4.8 gm. |
| Carrageenan (Genuvisco J. Hercules) | 1.0 gm. |
| Corn Oil | 35.2 gm. |
| Polyoxyethylene (20) Sorbitan Monostearate (Tween 60-Atlas ICI America) | 3.5 gm. |
| Sorbitol 70% Solution | 41.0 gm. |
| Sodium Chloride | 23.5 gm. |
| Potassium Sorbate (Sorbistat K) | .9 gm. |
| Sodium Benzoate | .4 gm. |
| Citric Acid, Hydrous | 1.2 gm. |
| Yellow Color Number 5, 10% Solution | .2 gm. |
| Yellow Color Number 6, 10% Solution | .7 gm. |
| Artificial Milk #Y-938 (Norda) | .3 gm. |
| Mustard, Double Fine | .4 gm. |
| Onion Powder | 14.2 gm. |
| Worcestershire Sauce | .8 gm. |
| Imitation Cheddar Cheese #19517 (Stange) | .6 gm. |
| Separated and Purified Cellulose Fibers (Brown Company Solka-Floc BW-300) | 305.8 gm. |
| Total | 1000 gm. |

Gum mucilage mixtures were first prepared independently. Expressed on a per kilogram basis, the 4.8 gm. of locust bean gum was added in-stream fashion to 175 gm. of water at 175° F. and mixed in a Waring type blendor for 3 minutes. The resulting gum mucilage mix was stirred at 175° F. for 10 minutes. The 4.8 gm. of guar gum was added in-stream fashion to 223 gm. of water at 100° F. in a Waring blendor and was mixed for a period of 3 minutes. The resulting mucilage mixture was held at 100° F. The 1.0 gm. of carrageenan was added in-stream fashion to 162.7 gm. of water at 120° F. in a Waring blendor and mixed for a period of 3 minutes. The three mixtures were then mixed together in a Waring blendor for 2 minutes to form a combined gum mucilage mixture. Then all of the other ingredients except corn oil, polyoxyethylene (20) sorbitan monostearate and the cellulose fibers were added and mixed with the combined gum mucilage mixture in the Waring blendor at high speed for 3 minutes.

The 35.2 gm. of corn oil and the 3.5 gm. of polyoxyethylene (20) sorbitan monostearate, which were previously heated and mixed together at 130° F. were then mixed with the remaining ingredients other than the cellulose fibers.

The mixture was then added to the 305.8 gm. of cellulose fibers in the bowl of a small Hobart mixer and beaten together with a wire basket whip at top speed for approximately 3 to 5 minutes.

The resulting oleaginous fibrous imitation cheese product had a pH of approximately 4.2, and a distinctive cheddar flavor and a natural easily spread, slightly oleaginous, cheese-like consistency. The cellulose fiber particulate material comprised approximately 70% of the weight of the finished product excluding water, approximately 30% of the overall weight of the finished product including water. The hydrocolloids comprised 2.4% and the corn oil comprised 8%, respectively, of the non-water ingredients.

EXAMPLE III

A low caloric content oleaginous fibrous imitation margarine was prepared having the following composition.

| Ingredient | Amount | Percent by Weight |
|---|---|---|
| Water | 2830 ml. (approx. 2830 gm.) | 57.61 |
| Locust Bean Gum | 27.0 gm. | 0.55 |
| Guar Gum | 38.4 gm. | 0.78 |
| Gum Acacia | 144.0 gm. | 2.93 |
| Sorbitol 70% Solution | 182.4 gm. | 3.71 |
| Sodium Chloride | 115.2 gm. | 2.35 |
| Potassium Sorbate (Sorbistat K) | 3.84 gm. | 0.08 |
| Sodium Benzoate, Powder | 1.905 gm. | 0.04 |
| Citric Acid, Hydrous | 3.0 gm. | 0.06 |
| Polyoxyethylene (20) Sorbitan Monostearate | 19.5 gm. | 0.40 |
| Corn Oil | 360.0 gm. | 7.33 |
| Beta-Carotene, 24% (400,000 Vit. A. units/gram) | 0.225 gm. | 0.005 |
| Artificial Butter Flavor 57.390/A-(Firmenich) | 1.5 ml. (approx. 1.5 gm.) | 0.03 |
| Separated and Purified Cellulose Fibers (Brown Company Solka-Floc BW-300) | 1,185.0 gm. | 24.12 |
| Total | 4,912 gm. | 100% |

Gum mucilage mixtures were first prepared. The 27.0 gm. of locust bean gum was added in-stream fashion to 770 ml. of water at 175° F. and was mixed in a Waring blendor for a period of 3 minutes. The resulting mucilage mixture was then stirred at a temperature of 175° F. for 10 minutes.

The 38.4 gm. of guar gum was added in-stream fashion to 1,060 ml. of water at 100° F. in a Waring blendor for a period of 3 minutes. The resulting mucilage mixture was held at 100° F.

The 144.0 gm. of gum acacia was added in-stream fashion to 1,000 ml. of water at 170° F. in a Waring blendor and was mixed for a period of three minutes. After the gum acacia mucilage mixture was prepared, the Sorbitol 70% Solution, the salt, the potassium sorbate, the sodium benzoate, and the citric acid were added thereto and mixed at high speed for three minutes.

In a separate Waring type blendor, the polyoxyethylene (20) sorbitan monostearate, the corn oil, the beta-carotene, and the artificial butter flavor were heated and mixed together at 130° F.

All of the above mixtures of ingredients were added together in the bowl of a 30 quart Hobart mixer, and were vigorously mixed together with a wire basket whip at top speed for approximately 3–5 minutes. After this period of mixing, the cellulose fiber particulate was slowly added to the mixture, with the mixer operating at slow speed. The Hobart mixer was then switched to top speed and the total mass mixed together for a period of five minutes. The resulting 4912 grams of oleaginous fibrous simulated margarine product had a butter-like flavor, color, and consistency and a final density of approximately 1.15 specific gravity with a pH of 4.35 to 4.4. The cellulose fiber particulate comprised approximately 57% of the weight of the constituents of the imitation margarine product excluding water, and approximately 24% of the total weight of the product including water. The fibrous cellulose comprised 67.5% and the hydrocolloids and the oil comprised respectively 11.9% and 20.5% of the non-water base ingredients. The oil comprised 17.3% of all non-water ingredients.

EXAMPLE IV

One kilogram of low caloric content oleaginous fibrous imitation margarine was prepared having the ingredients listed below.

| Ingredient | Amount | | Calories Per Gram | Total Calories |
|---|---|---|---|---|
| Water | 581.32 | gm. | 0 | 0 |
| Locust Bean Gum | 4.75 | gm. | 4.0 | 19.0 |
| Guar Gum | 4.75 | gm. | 4.0 | 19.0 |
| Carrageenan | 0.95 | gm. | 4.0 | 3.8 |
| Sorbitol 70% Solution | 41.0 | gm. | 2.8 | 114.8 |
| Salt (Sodium Chloride), Iodized | 23.5 | gm. | 0 | 0 |
| Potassium Sorbate (Sorbistat K) | 0.85 | gm. | 0 | 0 |
| Sodium Benzoate | 0.42 | gm. | 0 | 0 |
| Citric Acid, Hydrous | 0.6 | gm. | 4.0 | 2.4 |
| Monosodium Glutamate | 0.6 | gm. | 0 | 0 |
| Corn Oil | 73.7 | gm. | 9.0 | 663.3 |
| Tween 60 (Polyoxyethylene (20) Sorbitan Monostearate) | 3.5 | gm. | 9.0 | 31.5 |
| Beta-Carotene 24% | 0.060 | gm. | 9.0 | 0.54 |
| Margarine Flavor 57.390/A-Firmenich | 0.3 | ml. | 4.0 | 1.2 |
| Separated and Purified Cellulose Fibers (Brown Company Solka-Floc BW-300) | 263.7 | gm. | 0 | 0 |
| | 1000.0 | gm. | | 855.54 Cal. |

178.77 gm. of water at a temperature of 175° F. was placed in a Waring blendor turned on to its first speed to move the water in a vortex. 4.75 gm. of locust bean gum was then added to the water in-stream fashion and mixed in for three minutes. This gum solution was held at 175° F. while awaiting further processing.

A second gum mucilage was prepared by placing 240.90 gm. of water at a temperature of 100° F. in a Waring blendor, creating a vortex in the water and adding 4.75 gm. of guar gum-THI in-stream fashion to the water and mixing for three minutes. This gum mixture was held at 100° F. while awaiting further processing.

A third gum mucilage was made by placing 161.65 gm. of water at 70° F. into a Waring blendor, creating a vortex in the water, and adding in-stream fashion 0.95 gm. of carrageenan and mixing for three minutes. The other gum mucilage mixtures listed above were then added in, and the total mixture was mixed together at high speed for two minutes. The corn oil, Tween 60, beta-carotene, and margarine flavor were heated to 130° F. and mixed together, and then added with all of the other ingredients listed above to the gum mucilages and the total mixed together for three minutes.

The 263.7 gm. of cellulose fibers was placed in the bowl of a Hobart mixer, and the previously mixed materials were added and mixed in with the cellulose fibers at top speed for approximately five minutes.

The resulting one kilogram of oleaginous simulated margarine product had a margarine color and flavor with a final density of approximately 1.15 specific gravity, a pH of between 4.0 and 4.5, and a calorie value of 0.856 calorie per gram. Regular margarine averages a caloric value of approximately 7.2 calories per gram. The cellulose fiber particulate comprised approximately 63% of the weight of all the constituents excluding water, and approximately 26.4% of the total product including water. The fibrous cellulose comprised 75.8% and the hydrocolloids and the oil comprised respectively 3% and 21.2% of the non-water base ingredients. The oil comprised 17.6% of all non-water ingredients.

The oleaginous fibrous simulated margarine product of Example IV was converted to a simulated salad dressing or mayonnaise consistency by the further addition and intermixing of 443.72 gm. of water, resulting in a product having 71% water content. Still further addition and intermixing of 924.97 gm. of water reduced the consistency to that of a cream soup. The soup consistency product had a water content of 82.32%. It is apparent that flavor adjustments may be made as necessary to produce a desired product that closely simulates the flavor of salad dressings and soups that consumers are accustomed to.

EXAMPLE V

One hundred grams of low calorie content oleaginous fibrous imitation margarine was prepared having the ingredients listed above in Example IV, and in the same proportions as are listed in Example IV, except that the fibrous cellulose utilized was prepared in the manner as specified below.

Two batches of fibrous cellulose derived from wood pulp (Solka-Floc BW-300) of 18 grams per batch were each placed in the thimble of a standard Soxhlet fat-extraction apparatus, and 200 milliliters (mls.) of a solvent mixture consisting of 50 mls. of methanol and 150 mls. of benzene was poured on the 18 grams of fibrous cellulose in the thimble. Refluxing was started, and the heat mantle of the Soxhlet apparatus was adjusted to give an even evaporation--condensation operation. Refluxing was continued under these conditions for a period of two hours, and then stopped.

The thimble containing the fibrous cellulose was removed, and the excess solvent mixture was drained off. The residual solvent drenched fibrous cellulose was then mixed with 100 mls. of water, and the fibrous cellulose--water suspension was then poured out onto a flat tray and dried at a temperature between 140° and 160° F.

26.37 gm. of the residual dried fibrous cellulose powder from the two batches of solvent extracted cellulose was then utilized to produce a simulated margarine sample having the ingredients and the proportions listed above in Example IV, except that only 100 gm. of margarine product was obtained. The resulting simulated margarine product had a density, a pH, and other physical properties which were identical to the margarine product as described in Example IV. The solvent extracted fibrous cellulose may be used in extremely bland flavored products such as lightly flavored margarine, whipped cream, and coffee creamer type products where a slight woody flavor present in some wood pulp derived cellulose may be detected. The slight woody flavor present in some untreated wood pulp derived fibrous cellulose is due in part to the resins, pectins, pitches, fats and oils in the wood pulp. These substances are soluble in and are extracted by the solvents used in the extraction procedure, with the solvent extracted cellulose fiber having the non-cellulose constituents substantially removed. However, any wood flavor overtones which might be present in untreated fibrous cellulose is rendered substantially undetectable by the stronger flavors used in such simulated products as cheese spreads and meat spreads.

Other solvents extraction methods may be utilized with similar success, including the use of such alternative solvents as ether, straight ethanol or straight methanol, trichloroethylene, dichloromethane, and chloroform.

EXAMPLE VI

One kilogram of a second oleaginous fibrous imitation cheese spread was prepared in the manner and having the constituents as described below.

| Ingredients | Amount | Calories Per Gram | Total Calories |
| --- | --- | --- | --- |
| Water | 563.88 gm. | 0 | 0 |
| Locust Bean Gum | 4.75 gm. | 4.0 | 19.0 |
| Guar Gum | 4.75 gm. | 4.0 | 19.0 |
| Carrageenan | 0.95 gm. | 4.0 | 3.8 |
| Sorbitol 70% Solution | 41.0 gm. | 2.8 | 114.8 |
| Salt (Sodium Chloride) | 23.5 gm. | 0 | 0 |
| Potassium Sorbate (Sorbistat K) | 0.85 gm. | 0 | 0 |
| Sodium Benzoate | 0.42 gm. | 0 | 0 |
| Citric Acid, Hydrous | 1.20 gm. | 4.0 | 4.8 |
| Yellow Color, No. 5, 10% Solution | 0.2 gm. | 0 | 0 |
| Yellow Color, No. 6, 10% Solution | 0.70 gm. | 0 | 0 |
| Artificial Milk Flavor No. Y-938 | 0.3 gm. | 4.0 | 1.2 |
| Mustard, Double Fine | 0.42 gm. | 4.0 | 1.68 |
| Onion Powder | 14.20 gm. | 3.5 | 49.7 |
| Worcestershire Sauce | 0.78 gm. | 0 | 3.12 |
| Monosodium Glutamate | 0.60 gm. | 0 | 0 |
| Imitation Cheddar Cheese No. 19517 (Stange) | 0.60 gm. | 4.0 | 2.4 |
| Corn Oil | 73.7 gm. | 9.0 | 663.3 |
| Tween 60 (Polyoxyethylene (20) Sorbitan Monostearate) | 3.5 gm. | 9.0 | 31.5 |
| Separated and Purified Cellulose Fibers (Brown Company Solka-Floc BW-300) | 263.7 gm. | 0 | 0 |
| | 1000.0 gm. | | 914.3 Cal. |

178.77 gm. of water at a temperature of 175° F. was placed in a Waring blendor set at first speed to create a vortex in the water. 4.75 gm. of locust bean gum was added in-stream fashion and mixed in with the water for a period of three minutes. This mucilage mixture was stirred and held at a temperature of 175° F.

223.46 gm. of water at a temperature of 100° F. was placed in a Waring blendor at first speed to create a vortex therein. 4.75 gm. of guar gum was added in-stream fashion to the water and mixed for three minutes. The resulting gum mucilage was held at 100° F.

161.65 gm. of water at a temperature of 70° F. was placed in a Waring blendor set at first speed to create a vortex, and 0.95 gm. of carrageenan was added in-stream fashion and mixed for a period of three minutes. The other gum solutions listed above were then added together to the carrageenan gum mixture, and the resulting mucilage combination was mixed at high speed for two minutes.

The corn oil and the Tween 60 were heated to 130° F. and mixed together, and then added with all of the above listed ingredients except the cellulose fiber to the gum mucilage mixture. The combination of ingredients was mixed at high speed for three minutes.

The 263.7 gm. of cellulose fibers were placed in the bowl of a Hobart mixer, and the above described mixture of ingredients was added together to the fibrous cellulose and mixed in for a period of five minutes at high speed.

The resulting product had a final density of approximately 1.15 specific gravity, a pH between 4.1 and 4.2, and had a texture which was easily spreadable. The total of the above ingredients resulted in one kilogram of simulated cheese spread, with cellulose fiber comprising 60.5% of the weight of the product excluding water, and 26.4% of the total product including water. The fibrous cellulose comprised 75.8% and the hydrocolloids and the oil comprised respectively 3% and 21.2% of the non-water base ingredients. The oil comprised 16.9% of all non-water ingredients. The simulated cheese spread had a caloric value of 0.914 calorie per gram compared to an average caloric value of 2.88 calories per gram for regular cheese spreads.

EXAMPLE VII

One kilogram of a low caloric content oleaginous fibrous imitation cheese dip was prepared having the following ingredients.

| Ingredient | Amount | |
|---|---|---|
| Water | 673.88 | gm. |
| Locust Bean Gum | 4.35 | gm. |
| Guar Gum | 4.35 | gm. |
| Carrageenan | 0.85 | gm. |
| Sorbitol 70% Solution | 41.0 | gm. |
| Salt (Sodium Chloride) | 23.5 | gm. |
| Potassium Sorbate (Sorbistat K) | 0.85 | gm. |
| Sodium Benzoate | 0.42 | gm. |
| Citric Acid, Hydrous | 1.2 | gm. |
| Yellow Color No. 5, 10% Solution | 0.2 | gm. |
| Yellow Color No. 6, 10% Solution | 0.7 | gm. |
| Artificial Milk Flavor | 0.3 | gm. |
| Mustard, Double Fine | 0.42 | gm. |
| Onion Powder | 14.2 | gm. |
| Worcestershire Sauce | 0.78 | gm. |
| Imitation Cheddar Cheese Flavor | 0.6 | gm. |
| Corn Oil | 54.0 | gm. |
| Polyoxyethylene (20) Sorbitan Monostearate (Tween 60-Atlas ICI America) | 3.0 | gm. |
| Separated and Purified Cellulose Fibers (Brown Company Solka-Floc BW-300) | 175.4 | gm. |

A gum mucilage was prepared by adding the 4.35 gm. of locust bean gum in-stream fashion to 218.77 gm. of water at 175° F. in a Waring blendor and mixing for a period of three minutes. This mucilage was stirred at a temperature of 175° F. for ten minutes.

A second gum mucilage was prepared by adding 4.35 gm. of guar gum in-stream fashion to 263.46 gm. of water at 100° F. in a Waring blendor set at its first speed. The mucilage was mixed for three minutes and then held at 100° F. to await further processing.

The 0.85 gm. of carrageenan was added in-stream fashion to 191.65 gm. of water at 120° F. in a Waring blendor set on first speed. This carrageenan mucilage was mixed for three minutes, and the locust bean gum and guar gum mucilages as prepared above were then added thereto and mixed in at the first speed of the blendor for two minutes.

The corn oil and the polyoxyethylene (20) sorbitan monostearate were mixed together and heated to 130° F., and then added to the gum mucilages as prepared above. All of the other ingredients listed above except the cellulose fibers were then added to the gum mucilages and were mixed in at the highest speed of the Waring blendor for three minutes.

The 175.4 gm. of cellulose fibers were placed in a bowl of a Hobart mixer, and the mixture prepared above was added thereto and mixed for five minutes on high speed with a beater.

The resulting oleaginous fibrous simulated cheese product had a cheese-like flavor and a thick fluid consistency. The pH of the product was between 4.1 and 4.2. The fibrous cellulose comprised 53.8% of all non-water components of the final product and 73.4% of the non-water base ingredients. The hydrocolloids and the oil comprised 4% and 22.6% of the base ingredients respectively. The oil comprised 16.6% of all non-water ingredients.

EXAMPLE VIII

One kilogram of low calorie oleaginous fibrous imitation ham paste was prepared having the following ingredients.

| Ingredient | Amount | |
|---|---|---|
| Water | 601.43 | gm. |
| Locust Bean Gum | 4.45 | gm. |
| Guar Gum | 4.45 | gm. |
| Carrageenan | 0.88 | gm. |
| Sorbitol 70% Solution | 38.45 | gm. |
| Salt (Sodium Chloride) | 27.5 | gm. |
| Potassium Sorbate (Sorbistat K) | 0.78 | gm. |
| Sodium Benzoate | 0.4 | gm. |
| Citric Acid, Hydrous | 1.0 | gm. |
| Monosodium Glutamate | 1.31 | gm. |
| Worcestershire Sauce | 1.87 | gm. |
| Total Ham Flavor (Polak's Frutal Works) | 5.0 | gm. |
| Red Shade Replacement No. 2, 10% Solution | 0.15 | gm. |
| Instant Caramel 602 | 1.23 | gm. |
| Corn Oil | 69.11 | gm. |
| Polyoxyethylene (20) Sorbitan Monostearate (Tween 60-Atlas ICI America) | 3.28 | gm. |
| Separated and Purified Cellulose Fibers (Brown Company Solka-Floc BW-300) | 238.71 | gm. |

The first gum mucilage was prepared by adding the 4.45 gm. of locust bean gum in-stream fashion to 167.67 gm. of water at 175° F. in a Waring blendor set on first speed to create a vortex. After mixing for three minutes, the resulting mucilage was held in a hot water bath and slowly stirred at 175° F. for ten minutes.

The 4.45 gm. of guar gum was added in-stream fashion to 282.18 gm. of water at 100° F. in a Waring blendor set on first speed to create a vortex. After mixing for three minutes, the mucilage was held at 100° F. to await further processing.

The 0.88 gm. of carrageenan was added in-stream fashion to 151.58 gm. of water at 120° F. in a Waring blendor set on first speed to create a vortex, and was mixed in for three minutes. The previously mixed gum mucilages were then added into the carrageenan mucilage and were mixed together at high speed for three minutes.

The corn oil and the polyoxyethylene (20) sorbitan monostearate were mixed and gently heated to 130° F. and then added to the previous mixed gum mucilages. All of the other above ingredients except that cellulose fiber were then added to the gum mucilage mixtures in a Waring blendor and mixed together on high speed for three minutes.

The 239.15 gm. of powdered cellulose fiber was placed in the bowl of a Hobart mixer. The above mixed ingredients were added thereto and mixed in on high speed for five minutes with a beater.

The resulting paste-like oleaginous fibrous simulated ham paste had a smooth, very slightly oil texture and a strong ham-like flavor. The pH of the product was between 4.2 and 4.5. The fibrous cellulose comprised 60.0% of all non-water ingredients and 75.19% of all non-water base ingredients. The hydrocolloids and the oil comprised respectively 3.08% and 21.73% of the non-water base ingredients. The oil comprised 17.3% of all non-water ingredients.

EXAMPLE IX

One kilogram of low calorie oleaginous fibrous imitation margarine was prepared having the following ingredients.

| Ingredient | Amount | |
| --- | --- | --- |
| Water | 607.74 | gm. |
| Propylene Glycol Alginate | 4.5 | gm. |
| Sodium Alginate | 1.5 | gm. |
| Carrageenan | 0.24 | gm. |
| Sodium Carboxymethylcellulose | 4.0 | gm. |
| Corn Oil | 110.0 | gm. |
| Lecithin | 2.0 | gm. |
| Mono- and Di-glycerides (Durkee EC-187-M) | 3.0 | gm. |
| Glycerine | 40.0 | gm. |
| Sorbitol (U.S.P. Powder-Atlas Chemical) | 5.3 | gm. |
| Salt (Sodium Chloride) | 5.5 | gm. |
| Potassium Chloride | 5.5 | gm. |
| Citric Acid, Hydrous | 0.5 | gm. |
| Beta-Carotene (24% Solution) | 0.2 | gm. |
| Imitation Milk Flavor (Firmenich) | 0.015 | gm. |
| Imitation Butter Flavor (Firmenich) | 0.01 | gm. |
| Separated and Purified Cellulose Fibers (Brown Company Solka-Floc BW-300) | 160.0 | gm. |
| Water Repellent (Calcium Stearate) Treated Cellulose Fibers (Brown Company Solka-Floc D-White) | 50.0 | gm. |

The corn oil was heated in a metal bowl to 150° F. and the lecithin and the mono- and di-glycerides were added thereto and the oil stirred until the ingredients were thoroughly mixed.

The water was heated to 130° F. and placed in the bowl of a Waring blendor turned on to create a vortex in the water. The hydrocolloids comprising the propylene glycol, alginate, the sodium alginate, the carrageenan, and the sodium carboxylmethylcellulose, were added, thereto and mixed for three minutes at high speed. The oil and emulsifiers mixture was added to the water and gum mixture, and all of the other ingredients listed above except the cellulose fibers were then added thereto and mixed for three minutes at high speed.

The mixed ingredients were then heated to 160° F. and kept at that temperature for 30 minutes to pasteurize. The mixture was then homogenized in a Manton-Gaulin two stage homogenizer utilizing 2500 to 3500 p.s.i. in the first stage and 500 p.s.i. in the second stage.

The homogenized mixture was then placed in the bowl of a mixer having a dough paddle, and the cellulose fibers were added thereto and mixed in therewith for five minutes.

The product was then adjusted by the addition of acid pH modifying citric acid to a pH of 4.4 and heated to 160° F. for sufficient time to pasteurize.

The resulting oleaginous fibrous simulated margarine product had a margarine color and flavor, and a smooth, margarine texture. The fibrous cellulose (both untreated and water repellent coated) comprised 53.54% of all non-water ingredients and 63.7% of the non-water base ingredients. The hydrocolloids and the oil comprised respectively 3.1% and 33.31% of the non-water base ingredients. The oil comprised 28% of all non-water ingredients.

EXAMPLE X

One kilogram of low calorie oleaginous fibrous imitation cheese spread was prepared having the following ingredients.

| Ingredient | Amount | |
| --- | --- | --- |
| Water | 603.4 | gm. |
| Sodium Carboxymethylcellulose (CMC 7-HP Hercules) | 3.0 | gm. |
| Carrageenan | 0.4 | gm. |
| Propylene Glycol Alginate | 4.0 | gm. |
| Corn Oil | 80.0 | gm. |
| Mono- and Di-glycerides (Durkee EC-187-M) | 4.0 | gm. |
| Polyoxyethylene (20) Sorbitan Monostearate (Tween 60) | 1.0 | gm. |
| Sorbitol (U.S.P. Powder-Atlas Chemical) | 35.0 | gm. |
| Salt (Sodium Chloride) | 11.0 | gm. |
| Potassium Chloride | 11.0 | gm. |
| Citric Acid, Hydrous | 1.2 | gm. |
| Imitation Cheese Flavor | 0.6 | gm. |
| Annato Cheese Color | 0.3 | gm. |
| Beta-Carotene (24%) | 0.1 | gm. |
| Artificial Cheddar Cheese Flavor Enhancer (Food Material Co.) | 5.0 | gm. |
| Separated and Purified Cellulose Fibers (Brown Company Solka-Floc BW-300) | 240.0 | gm. |

The oil was heated to 150° F. and the emulsifiers, consisting of the polyoxyethylene (20) sorbitan monostearate and the mono- and di-glycerides, were added thereto. The mixture was stirred until the emulsifiers were completely melted and thoroughly mixed with the corn oil.

The water was heated to 130° F. and was placed in the bowl of a Waring blendor. The blendor was placed on first speed to create a vortex and the hydrocolloids, consisting of the sodium carboxymethylcellulose, the carrageenan, and the propylene glycol alginate were added thereto and mixed in for three minutes at high speed. The oil and emulsifier mixture was then added thereto, and all of the other ingredients above listed except the cellulose fibers were added thereto and mixed in for a period of three minutes.

The resulting liquid mixture was heated to 165° F. and kept at that temperature for 30 minutes for pasteurization. After pasteurization, the liquid was passed through a two stage Manton-Gaulin homogenizer having a 2500 to 3500 p.s.i. first stage and a 500 p.s.i. second stage.

The homogenized liquid was placed in the bowl of a mixer having a dough paddle, and the cellulose fibers were added in therewith and mixed in for a period of five minutes.

The product was then adjusted by the addition of citric acid to a pH of between 4.2 and 4.5, and pasteurized.

The resulting oleaginous fibrous simulated cheese product had a pH between 4.2 and 4.5, with a cheese-like color and flavor, and a smooth texture. The fibrous cellulose comprised 60.5% of all non-water ingredients and 73.3% of the non-water base ingredients. The hydrocolloids and the oil comprised respectively 2.3% and 24.43% of the non-water base ingredients. The oil comprised 20.2% of all non-water ingredients.

EXAMPLE XI

One kilogram of an oleaginous fibrous food composition having a flavor and texture simulating that of deviled ham was prepared having the following ingredients.

| Ingredient | Amount |
| --- | --- |
| Water | 604.94 gm. |
| Locust Bean Gum | 3.67 gm. |
| Guar Gum | 3.67 gm. |
| Carrageenan | 0.72 gm. |
| Sorbitol 70% Solution | 31.74 gm. |
| Salt (Sodium Chloride) | 27.48 gm. |
| Potassium Sorbate (Sorbistat K) | 0.77 gm. |
| Sodium Benzoate | 0.50 gm. |
| Monosodium Glutamate | 1.08 gm. |
| Worcestershire Sauce | 1.54 gm. |
| Instant Caramel 602 | 1.23 gm. |
| Red Shade Replacement No. 2, Textured Vegetable Protein (Miratex 210, Staley-3 s) | 53.11 gm. |
| Separated and Purified Cellulose Fibers (Brown Company Solka-Floc BW-300) | 204.21 gm. |

The textured vegetable protein (TVP) chunks were first grated and sized to yield chunks which would provide the desired texture to the overall product. This was accomplished by putting the TVP in a Waring blendor type mixer. The mixer was put on a grating speed for 15 seconds, and the grated TVP was passed through a sixteen mesh sieve. The portion retained by the sieve was regrated in the mixer. The sifted portion was then passed through an 18 mesh sieve. 53.11 gm. of the TVP that was retained on the 18 mesh sieve was then mixed and soaked for 30 minutes in a previously mixed solution of 108.40 gm. of water at 120° F., 0.12 gm. of potassium sorbate, 0.06 gm. of sodium benzoate, and 0.04 gm. of hydrous citric acid. This mixture was retained for later incorporation into the final product.

The first gum mucilage was prepared by adding the 3.67 gm. of locust bean gum in-stream fashion to 138.41 gm. of water at 175° F. in a Waring blendor set on first speed to create a vortex. This mucilage was mixed for three minutes, then held and stirred in a hot water bath at 175° F. for ten minutes.

The 3.67 gm. of guar gum was added in-stream fashion to 232.98 gm. of water at 100° F. in a Waring blendor set on first speed to create a vortex. After mixing for three minutes, the gum mucilage was held for further processing at 100° F.

The 0.72 gm. of carrageenan was added in-stream fashion to 125.15 gm. of water at 120° F. in a Waring blendor set at first speed to create a vortex. After three minutes of mixing, the other gum mucilages described above were added thereto and mixed in for two minutes.

The corn oil and the polyoxythylene (20) sorbitan monostearate were mixed and heated to 130° F. and then were added into the gum mucilage mixture. All of the other above ingredients except the cellulose fibers and the hydrated TVP were added to the corn oil--mucilage mixture and were mixed in on high speed for three minutes.

The separated cellulose fibers were placed in the bowl of a Hobart mixer and the above described mixture was added thereto and mixed in for five minutes on high speed with a beater. The hydrated TVP was then added thereto and mixed in for three minutes.

The final oleaginous fibrous simulated deviled ham product had a pH of approximately 5.6 and a strong ham flavor. The chunks of TVP were readily discernable upon tasting, and gave the product an overall chewy, meaty texture. The fibrous cellulose comprised 51.69% of all non-water ingredients and 75.82% of the non-water base ingredients. The hydrocolloids and the oil comprised respectively 3% and 21.19% of the non-water base ingredients. The oil comprised 14.4% of all non-water ingredients.

The fundamental ingredients required to produce an oleaginous fibrous food composition in accordance with my invention having a substantial proportion of non-caloric cellulose fiber are the particulate cellulose fiber itself, water, edible oil, and certain water soluble gum mucilages. These ingredients have been referred to herein as the "base ingredients". As described above, cellulose fiber utilized may be any fibrous particulate material of sufficiently small fiber size to be utilized in food products. The water provides a non-caloric base for the product which gives the product softness and spreadability. Clean tap water may be used with adjustments to the final pH of the product being made as desired. Pasteurization and bacteriological control agents may be utilized as necessary to provide satisfactory stability.

The hydrocolloids (gums) such as those listed above for the various examples function to provide the coherency and fundamental texture of the resulting product. The gum combination acts as a moisture binder and a thickening agent, and provides a colloidal suspension matrix in which the solid fibrous cellulose particles are held. The gum solutions also render the relatively rough natural fibrous cellulose particle smooth to the palate. Thus, a sufficient amount of gum must be used to support the desired quantity of cellulose particles in suspension. The gum combination acts secondarily to help stabilize the oil in water emulsion when oils are added to the basic product. The gums coincidentally function as a whipping agent, as an inhibitor of syneresis, and to a certain extent simulate an oleaginous texture which is desirable from the standpoint of palatability with respect to simulated foods of the nature of margarines, cheeses, dips and related types of foods. A number of other gums may be used in the product of my invention, including by way of example, but not limitation gum ghatti, gum karaya, gum tragacanth, psyllium seed gum, quince seed gum, high and low methoxylated pectins, aribinogalactan, agar, furcelleran, alginates, modified and pregelatinized starches, dextran, xanthan and related microbial gums, gelatin, cellulose gum derivatives, and synthetic hydrocolloids. The combination of various gums is usually preferable although only one gum is necessary, since each type of gum provides different qualities of palatability and mouth feel to the final product. A particular combination of gums may thus be selected to obtain better mouth feel and texture than may be obtained with any single type of gum.

The corn oil provides a smooth flavor sensation and reduces the gummy texture inherent in the gum solution. It also permits the incorporation of air when used in conjunction with the polyoxyethylene (20) sorbitan monostearate, which it solubilizes, while it also solubilizes the beta-carotene used to color the margarine, thus allowing simulation of the density and character of the desired product. Other equivalent types of oil are safflower oil, cotton seed oil, peanut oil, sesame oil, soy bean oil, sunflower seed oil, coconut oil, and other vegetable oils, with the addition of anti-oxidants as necessary. Hydrogenated fats and oils may also be utilized by heating the solid fats to a liquid before combining with the other ingredients. Saturated fats and all animal fats are preferably avoided as much as possible because of the desirability of limiting the intake of such fats by humans, but where such fats are desirable, saturated and animal fats may also be used.

The other ingredients listed in the examples given above are provided for the purpose of flavoring, coloring, to enhance physical and biological stability, and to provide a product texture and form as similar as possible to the food product being simulated. Thus these ingredients are not critical to our invention, but are desirable to provide an oleaginous fibrous simulated food product which is as close to natural as possible and which is palatable to the consumer. The function of these additional ingredients, and examples of alternative products having similar functions are listed below.

The polysorbate 60 or Tween 60 (polyoxyethylene (20) sorbitan monostearate) promote and stabilize an oil in water emulsion and facilitate the incorporation of air into the overall mixture. Any emulsifying agent that promotes an oil in water emulsion may be utilized, such as lecithin, decaglycerol distearate, decaglycerol monolaurate, ethoxylated mono- and di-glycerides, polyethylene glycol, and lactylil stearate, polyoxyethylene (20) sorbitan tri-stearate, polyoxyethylene (20) sorbitan mono-oleate, sorbitan monostearate, propylene glycol, and glycerol monostearate.

The sorbitol 70% solution, which will be referred to herein as an humectancy agent, provides humectancy and sweetness, and also provides a certain amount of preserving action. Other humectancy agents providing these functions to a substantial extent are glycerine, propylene glycol, dextrose, sucrose, corn syrup (dry or wet), invert sugar, fructose, levulose, lactose, maltose, and xylose. The salt (sodium chloride) is provided for the purpose of flavor and also has some incidental preserving action. Potassium chloride may alternatively be utilized in products for those persons whose intake of sodium chloride must be limited.

The potassium sorbate (sorbistat K) and the sodium benzoate are both utilized as microbial inhibitors. Other feasible microbial inhibitors are sorbic acid, sodium sorbate, benzoic acid, methyl and propyl ester of P-hydroxybenzoic acid, and propionic acid. Pasteurization can be utilized to inactivate pathogenic organisms. Sterilization and aseptic packaging may also be used as appropriate. If the product is to be handled and stored without refrigeration, the pH of the final product must be maintained at 4.6 or less.

The citric acid acts as a flavoring agent and also provides inhibition of microbial growth since it lowers the pH to safer levels, and also permits the other microbial inhibitors to be more effective. Anhydrous citric acid would also be utilized, as well as lactic acid, acetic acid, malic acid, fumaric acid, adipic acid, tartaric acid, and potassium hydrogen tartrate.

The yellow color No. 5, 10% solution and the yellow color No. 6, 10% solution are provided to simulate the color of cheese. Various types of annato may also be utilized to simulate such colors, and it is apparent that other food colorings would be appropriate where other products are being simulated.

It is apparent that the flavoring materials will depend on the particular product being simulated, and can be added in varying amounts to satisfy the particular taste as desired.

Various other food materials having beneficial nutritional value, including high, medium, and low calorie content materials, may be added to my base product without materially affecting the basic and novel characteristics of my product to provide simulated foods which will satisfy consumers' concern and need for nutrition. Such materials, which provide nutrition in addition to that supplied by the gums and oil, can consist of proteins, fats or carbohydrates, or combinations thereof. One example of a simulated food composition which includes nutritional material in the form of textured vegetable protein (TVP) is the product of Example XI, above.

It is understood that my invention is not confined to the particular embodiments illustrated and described herein, but embraces all such modified forms thereof as may come within the scope of the following claims.

I claim:

1. An oleaginous fibrous composition for human consumption, consisting essentially of:
   (a) a binding mixture of edible oil and edible gum in water with an emulsifying agent uniformly mixed therein in an amount sufficient to stabilize the oil in colloidal suspension within the binding mixture, the edible oil comprising between about 8% and 60% to impart a significant oleaginous character to the composition and the gum comprising at least about 0.1% of the composition on a dry weight basis; and
   (b) particulate fibrous cellulose, comprising between about 10% and 85% of the composition on a dry weight basis, uniformly intermixed within the binding mixture, said fibrous cellulose particles having an average particle length of not more than about 40 microns.

2. The composition of claim 1 wherein the fibrous cellulose comprises refined powdered cellulose derived from wood pulp.

3. The composition of claim 1 wherein the fibrous cellulose comprises refined powdered cellulose derived from wood pulp which has been solvent treated to substantially remove the noncellulose constituents.

4. The composition of claim 1 including a flavoring agent present therein in amounts to impart flavor to the composition.

5. The composition of claim 1 including a coloring agent present therein in amounts to impart color to the composition.

6. The composition of claim 1 including a microbial growth inhibiting agent present therein.

7. The composition of claim 1 including an acid pH modifying substance present in the composition in an amount sufficient to lower the pH of the composition to a value of not more than 4.6.

8. The composition of claim 1 wherein the edible gum includes at least one gum selected from the group consisting of carrageenan, carboxymethylcellulose, locust bean gum, guar gum, gum acacia, gum ghatti, gum karaya, gum tragacanth, psyllium seed gum, quince seed gum, high and low methoxylated pectins, aribinogalactan, agar-agar, furcelleran, alginates, dextran, xanthan, cellulose gum derivatives, and synthetic hydrocolloids.

9. The composition of claim 1 wherein the edible oil is a vegetable oil.

10. The composition of claim 1 wherein the edible oil is selected from the group consisting of corn oil, safflower oil, cotton seed oil, peanut oil, sesame seed oil, soy bean oil, coconut oil and sunflower seed oil.

11. The composition of claim 1 wherein the edible oil is selected from the group consisting of hydrogenated oil and hydrogenated fat.

12. A process for producing an oleaginous fibrous composition for human consumption consisting essentially of:
  (a) mixing at least one edible gum in an amount equal to at least 0.1% of the composition on a dry weight basis with water;
  (b) mixing an edible oil or fat in an amount between about 8% and 60% of the composition on a dry weight basis to impart a significant oleaginous character to the composition with at least one emulsifier at a temperature sufficient to completely melt the oil or fat and emulsifier mass;
  (c) thoroughly mixing the oil and emulsifier mass with the edible gum and water suspension to produce a binding mixture, said emulsifier used in an amount sufficient to stabilize the oil in colloidal suspension within the binding mixture; and
  (d) thoroughly mixing particulate fibrous cellulose having an average particle length of not more than about 40 microns in an amount equal to between about 10% and 85% of the composition on a dry weight basis into the binding mixture to uniformly distribute the fibrous cellulose particles throughout the entire mass of the binding mixture.

13. The process of claim 12 wherein the gum is at least one selected from the group consisting of carrageenan, carboxymethylcellulose, locust bean gum, guar gum, gum acacia, gum ghatti, gum karaya, gum tragacanth, psyllium seed gum, quince seed gum, high and low methoxylated pectins, aribinogalactan, agar, furcelleran, alginates, modified and pregelatinized starches, dextran, xanthan and related microbial gums, gelatin, cellulose gum derivitives, and synthetic hydrocollodis.

14. The process of claim 12 wherein the edible oil is vegetable oil.

15. The process of claim 12 wherein the emulsifier is at least one selected from the group consisting of polyoxyethylene (20) sorbitan monostearate, lecithin, decaglycerol distearate, decaglycerol monolaurate, ethoxylated mono- and di-glycerides, polyethylene glycol, lactylil stearate, polyoxyethylene (20) sorbitan tri-stearate, polyoxyethylene (20) sorbitan mono-oleate, sorbitan monostearate, propylene glycol, and glycerol monostearate.

16. The process of claim 12 wherein the edible oil is selected from the group consisting of corn oil, safflower oil, cotton seed oil, peanut oil, sesame seed oil, soy bean oil, coconut oil and sunflower seed oil.

17. The process of claim 12 wherein the edible oil is selected from the group consisting of hydrogenated oil and hydrogenated fat.

18. The process of claim 12 wherein the fibrous cellulose comprises refined powdered cellulose derived from wood pulp.

19. The process of claim 12 wherein the water comprises at least 40% by weight of the final composition.

20. The process of claim 12 wherein at least one coloring substance is added to the binding mixture in amounts to impart color to the composition.

21. The process of claim 12 wherein at least one flavoring substance is added to the binding mixture in amounts to impart flavor to the composition.

22. The process of claim 12 wherein a high shear force type mixer is used for steps (a)-(c) thereof.

23. The process of claim 12 wherein, prior to the addition of particulate fibrous cellulose to the binding mixture, the binding mixture is subjected to additional treatment comprising:
  (a) heating the binding mixture to a temperature of at least 120° F., and
  (b) passing the heated binding mixture through an homogenizer to stabilize the suspension of gum and oil within the mass of the binding mixture.

24. The process of claim 12 wherein the composition is heat treated at a sufficient temperature and for sufficient time to pasteurize the mass of the composition.

25. The process of claim 12 including the additional step of adding an acid pH-modifying substance to the composition in an amount sufficient to adjust the pH to a value of not more than 4.6.

26. An oleaginous fibrous composition for human consumption, consisting essentially of:
  (a) a binding mixture of edible oil and edible gum in water with an emulsifying agent uniformly mixed therein in an amount sufficient to stabilize the oil in colloidal suspension within the binding mixture, the edible oil comprising between about 8% and 60% to impart a significant oleaginous character to the composition and the gum comprising at least about 0.1% of the composition on a dry weight basis;
  (b) particulate fibrous cellulose, comprising between about 10% and 85% of the composition on a dry weight basis, uniformly intermixed within the binding mixture, said fibrous cellulose particles having an average particle length of not more than about 40 microns; and
  (c) a humectant within the binding mixture in an amount sufficient to impart preserving action to the composition for human consumption.

27. An oleaginous fibrous composition for human consumption, consisting essentially of:
  (a) a binding mixture of edible oil and edible gum in water with an emulsifying agent uniformly mixed therein in an amount sufficient to stabilize the oil in colloidal suspension within the binding mixture, the edible oil comprising between about 8% and 60% to impart a significant oleaginous character to the composition and the gum comprising at least about 0.1% of the composition on a dry weight basis;
  (b) particulate fibrous cellulose, comprising between about 10% and 85% of the composition on a dry weight basis, uniformly intermixed within the binding mixture, said fibrous cellulose particles having an average particle length of not more than about 40 microns; and (c) textured vegetable protein within the binding mixture in an amount sufficient to impart texturization and nutritional value to the composition for human consumption.

28. A process for producing an oleaginous fibrous composition for human consumption consisting essentially of:

(a) mixing at least one edible gum in an amount equal to at least 0.1% of the composition on a dry weight basis with water;

(b) mixing an edible oil in an amount between about 8% and 60% of the composition on a dry weight basis to impart a significant oleaginous character to the composition with at least one emulsifier at a temperature sufficient to completely melt the oil and emulsifier mass;

(c) thoroughly mixing the oil and emulsifier mass with the edible gum and water suspension to produce a binding mixture, said emulsifier used in an amount sufficient to stabilize the oil in colloidal suspension within the binding mixture;

(d) thoroughly mixing particulate fibrous cellulose having an average particle length of not more than about 40 microns in an amount equal to between about 10% and 85% of the composition on a dry weight basis into the binding mixture to uniformly distribute the fibrous cellulose particles throughout the entire mass of the binding mixture; and (e) adding during one of the said mixing steps a humectant in an amount sufficient to impart preserving action to the composition for human consumption.

29. A process for producing an oleaginous fibrous composition for human consumption consisting essentially of:

(a) mixing at least one edible gum in an amount equal to at least 0.1% of the composition on a dry weight basis with water;

(b) mixing an edible oil in an amount between about 8% and 60% of the composition on a dry weight basis to impart a significant oleaginous character to the composition with at least one emulsifier at a temperature sufficient to completely melt the oil and emulsifier mass;

(c) thoroughly mixing the oil and emulsifier mass with the edible gum and water suspension to produce a binding mixture, said emulsifier used in an amount sufficient to stabilize the oil in colloidal suspension within the binding mixture;

(d) thoroughly mixing particulate firbous cellulose having an average particle length of not more than about 40 microns in an amount equal to between about 10% and 85% of the composition on a dry weight basis into the binding mixture to uniformly distribute the fibrous cellulose particles throughout the entire mass of the binding mixture; and (e) adding during one of the said mixing steps textured vegetable protein in an amount sufficient to impart texturization and nutritional value to the composition for human consumption.

* * * * *

UNITED STATES PATENT AND TRADEMARK OFFICE
CERTIFICATE OF CORRECTION

PATENT NO. : 4,156,021
DATED : May 22, 1979
INVENTOR(S) : Terence W. Richardson

It is certified that error appears in the above-identified patent and that said Letters Patent are hereby corrected as shown below:

Column 2, line 16, "nonethless" should be --nonetheless--;

Column 15, cancel lines 19-35 and substitute therefor:

| Ingredient | Amount |
|---|---|
| Water | 604.94 gm. |
| Locust Bean Gum | 3.67 gm. |
| Guar Gum | 3.67 gm. |
| Carrageenan | 0.72 gm. |
| Sorbitol 70% Solution | 31.74 gm. |
| Salt (Sodium Chloride) | 27.48 gm. |
| Potassium Sorbate (Sorbistat K) | 0.77 gm. |
| Sodium Benzoate | 0.38 gm. |
| Citric Acid, Hydrous | 0.50 gm. |
| Monosodium Glutamate | 1.08 gm. |
| Worcestershire Sauce | 1.54 gm. |
| Instant Caramel 602 | 1.23 gm. |

UNITED STATES PATENT AND TRADEMARK OFFICE
CERTIFICATE OF CORRECTION

PATENT NO. : 4,156,021
DATED : May 22, 1979
INVENTOR(S) : Terence W. Richardson

It is certified that error appears in the above-identified patent and that said Letters Patent are hereby corrected as shown below:

| | |
|---|---|
| Red Shade Replacement No. 2, 10% Solution | 0.15 gm. |
| Total Ham Flavor (Polak's Frutal Works) | 5.04 gm. |
| Corn Oil | 57.06 gm. |
| Polyoxyethylene (20) Sorbitan Monostearate (Tween 60--Atlas ICI America) | 2.71 gm. |
| Textured Vegetable Protein (Miratex 210, Staley's) | 53.11 gm. |
| Separated and Purified Cellulose Fibers (Brown Company Solka-Floc BW-300) | 204.21 gm.-- |

Signed and Sealed this

Sixteenth Day of October 1979

[SEAL]

Attest:

RUTH C. MASON
*Attesting Officer*

LUTRELLE F. PARKER
*Acting Commissioner of Patents and Trademarks*

UNITED STATES PATENT AND TRADEMARK OFFICE
CERTIFICATE OF CORRECTION

PATENT NO. : 4,156,021
DATED : May 22, 1979
INVENTOR(S) : Terence W. Richardson

It is certified that error appears in the above—identified patent and that said Letters Patent is hereby corrected as shown below:

The term of this patent subsequent to May 16, 1995 has been disclaimed.

Signed and Sealed this

Seventh Day of September 1982

[SEAL]

*Attest:*

GERALD J. MOSSINGHOFF

*Attesting Officer*     *Commissioner of Patents and Trademarks*